Aug. 7, 1962 W. LEHMANN ET AL 3,048,732
ELECTROLUMINESCENT CELL
Filed Jan. 24, 1958

POOR INSULATING MATERIAL

INVENTORS
WILLI LEHMANN and
CLAUS H. HAAKE
BY
W. D. Palmer
ATTORNEY.

United States Patent Office 3,048,732
Patented Aug. 7, 1962

3,048,732
ELECTROLUMINESCENT CELL
Willi Lehmann and Claus H. Haake, Livingston, N.J., assignors to Westinghouse Electric Corporation, East Pittsburgh, Pa., a corporation of Pennsylvania
Filed Jan. 24, 1958, Ser. No. 711,095
4 Claims. (Cl. 313—108)

This invention relates to electroluminescent cells and, more particularly, to electroluminescent cells which are protected from electrical breakdown.

The phenomenon of electroluminescence was comprehensively disclosed by G. Destriau in London, Edinburgh and Dublin Philosophical Magazine, pages 700–737, Series 7, volume 38, Number 285 (October 1947). A recent complete summary of electroluminescence may be found in Destriau and Ivey article titled "Electroluminescence and Related Topics," Proceedings of the I.R.E., pages 1911–1940, volume 43, Number 12, December 1955. In the phenomenon of electroluminescence, selected phosphor materials are placed within the influence of an electric field, such as by sandwiching a selected phosphor material, usually with admixed dielectric material, between electrodes and applying a potential to these electrodes. While some electroluminescent devices are operable on direct current to produce light, the most efficient and usual type of electroluminescent devices are adapted to be energized by alternating current in order to produce luminescence. The selected phosphor materials are responsive to the applied electric field in order to produce light and are thus generally known as "field-responsive" phosphors. Normally, the more intense the electric field, the greater the light emission from the phosphor and it is thus desirable to increase the electric field intensities. The usable electric fields have been limited intensity, however, by the tendency of the phosphor and admixed dielectric material to break down, resulting in an arcing between cell electrodes with destruction of the cell.

It is the general object of this invention to avoid and overcome the foregoing and other difficulties of and objections to prior-art practices by the provision of an electroluminescent cell which is protected against electrical breakdown between the cell electrodes.

It is a further object to provide an electroluminescent cell which can be operated with greatly-increased brightness.

It is an additional object to provide an electroluminescent cell which operates with a uniform brightness over its entire surface.

It is another object to provide alternative embodiments for an electrical-breakdown-protected electroluminescent cell.

The aforesaid objects of the invention, and other objects which will become apparent as the description proceeds, are achieved by providing between the cell electrodes a layer of poor insulating material. This layer of poor insulating material is preselected with respect to thickness and resistivity as well as the thickness of the layer comprising the electroluminescent phosphor material and the dielectric constant of this phosphor material layer. Additional parameters which govern the selection and design of the layer of poor insulating material are the frequency of the alternating potential at which the cell is to be operated and the percent voltage drop across the additional layer of poor insulating material. All of the foregoing parameters must be considered in the selection and design of the poor-insulating-material layer in accordance with a formula as will be given hereinafter.

For a better understanding of the invention, reference should be had to the accompanying drawing wherein.

Figure 2:
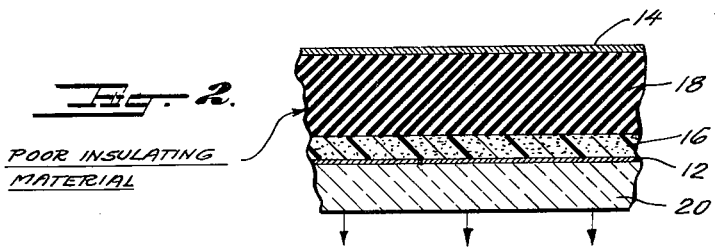
FIG. 2 is an enlarged, fragmentary, cross-sectional elevation of the cell as illustrated in FIG. 1, showing constructional details.
Figure 3:
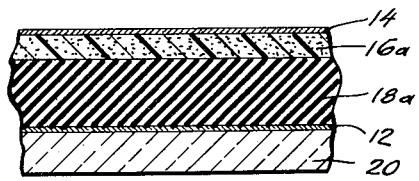
Figure 4:
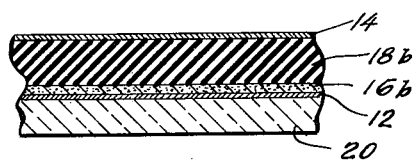
Figure 5:
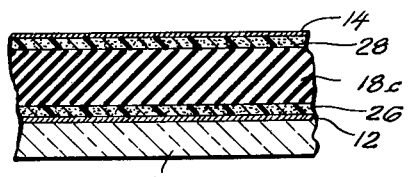

FIG. 3 corresponds to FIG. 2, but illustrates an alternative embodiment;

FIG. 4 corresponds to FIG. 2, but illustrates a still-further alternative embodiment;

FIG. 5 corresponds to FIG. 2, but illustrates yet-another alternative embodiment.

With specific reference to the form of the invention illustrated in the drawing, the numeral 10 illustrates generally an electroluminescent cell which generally comprises a first electrode layer 12 spaced slightly apart from a second electrode layer 14. Sandwiched between the electrode layers is a layer 16 comprising electroluminescent phosphor and also included between the electrode layers is an additional layer 18 of poor insulating material. The electrode layers 12 and 14 desirably are substantially parallel, but they need not be if graded field intensities are desired, for example.

The cell may be fabricated by depositing a thin, transparent conducting film of tin oxide on a glass foundation 20, which film of tin oxide forms the first electrode layer 12. Such thin, transparent conducting layers are well known and other materials such as indium, bismuth or aluminum oxides, for example, may be substituted for the tin oxide. Over the first electrode layer 12 is deposited a layer comprising electroluminescent phosphor. As an example, such a phosphor material may be prepared by admixing one mol of zinc sulfide with 0.01 mol of copper chloride. This admixture may be fired at about 900° C., for example, for about two hours. Desirably the firing is accomplished in an atmosphere comprising sulphur vapor. After firing, the phosphor material desirably is washed in a one-normal solution of sodium cyanide. This will produce an excellent electroluminescent phosphor. For other examples of electroluminescent phosphors, reference is made to the aforementioned Destriau and Ivey article.

A dielectric material is desirably admixed with the phosphor material and a dielectric material such as polyvinyl-chloride acetate is quite suitable. Other suitable dielectric materials are polystyrene or methyl methacrylate, for example. The respective proportions of phosphor and admixed dielectric are in no way critical and may be varied over wide limits, but as a specific example, the phosphor and dielectric material may be admixed in a ratio by weight of 1:1. The phosphor and admixed dielectric may be sprayed onto the electrode layer 12, using conventional spraying techniques. In the case of the phosphor and dielectric material are admixed to form the layer 16, the dielectric material should be light transmitting. Also, a separate layer of dielectric material may be provided, if desired.

The layer 18 of poor insulating material may comprise any material which has a resistivity falling within the range of from about $10^4$ to about $10^8$ ohm-centimeter, for example, and in addition, the layer 18 of poor insulating material should have a thickness at least twice the thickness of the layer 16 comprising the electroluminescent phosphor. As a specific example, the layer 16 comprising electroluminescent phosphor may have a thickness of about 50 microns and the layer 18 of poor insulating material may have a thickness of about 500 microns.

The second electrode layer 14 may be applied over the layer 18 of poor-insulating material by vacuum metalizing a thin layer of conducting material such as aluminum or silver, for example. The electrode layers 12 and 14 are adapted to have an alternating potential applied therebetween in order to energize the electroluminescent cell and lead conductors 22 and 24 may be soldered to the conducting electrode layers 12 and 14 respectively. It may be desirable in some cases to utilize bus-bar techniques for facilitating electrical connection, such bus-bar techniques being well known.

The layer 18 of poor insulating material may be formed of a hard-pressed board fabricated of asbestos and Portland cement and sold by Johns-Manville Sales Corp. under the trademark "Transite." This layer 18 of poor insulating material may also be fabricated of an alkyd varnish having added thereto about 4½% by weight of acetylene black. Further examples of suitable poor insulating materials are titania, zinc oxide and tungstic oxide. These latter materials may be rendered poor insulators by heating same in air at 800° C., for example, and reference is made to pages 172–175, "Leitfähigkeit und Leitungsmechanismus fester Stoffe" by Eduard Justi, published by Andenhoeck and Ruprecht, Gottingen, Germany (1948). Since the poor insulating zinc oxide, titania and tungstic oxide will normally occur in powder form, the use of these materials will normally necessitate the addition of a small amount of a suitable dielectric material to eliminate any air spaces, such as 5% by weight of polyvinyl-chloride acetate or polystyrene, for example.

Heretofore in the design of electroluminescent light sources, it has been desirable to provide a series resistance in the power supply line. This series resistance serves to limit the current in case of an electrical breakdown between the cell electrodes. Such a series resistance, however, will not prevent the formation of a breakdown, either through the application of excess voltage or because of weak or imperfect portions in the phosphor-dielectric. It is the purpose of the instant invention to place in series with the layer comprising electroluminescent phosphor an infinite number of resistances, each of which has such properties as to inhibit the formation of an electric arc between the cell electrodes. This infinite number of series resistances is provided by the additional layer 18 comprising the poor insulating material. In arriving at the design considerations for the poor-insulating-material layer, it is desirable to consider one minute element or increment of the cell. Each increment of the cell can be considered as a capacitor (that is, the phosphor-dielectric layer 16) connected in series with a resistor (that is, the poor insulating material layer 18). During cell operation, the voltage drop across each increment of the poor-insulating material layer 18 is proportional to its resistance, R, and the voltage drop across each increment of the layer 16 comprising the field-responsive phosphor is proportional to $$\frac{1}{\omega C}$$

Since these voltages are 90° out of phase with respect to one another, the resistance of the combination is expressed by the formula:

$$\text{Total resistance} = \sqrt{R^2 + \frac{1}{\omega^2 C^2}}$$

If the voltage drop across the layer 16 of poor insulating material were appreciable, considerable heat would be generated within this layer and the efficiency of the cell as a light source would be impaired. Accordingly, it is necessary, as a practical matter, that at least about 90% and preferably about 99% of the voltage applied to the cell electrodes 12 and 14 appear across the layer 16 comprising the field-responsive phosphor. Also, for the layer 18 of poor insulating material to be practical, at least about 0.1% of the voltage drop across the cell when operated should occur across this layer 18. Thus the ratio $\epsilon$ of the voltage drop across the layer of poor insulating material divided by the total voltage drop across the cell, that is, the voltage applied to the cell, should be from about 0.001 to about 0.1 and desirably should be about 0.01. With the foregoing values of $\epsilon$, the following equation will hold true:

$$\sqrt{R^2 + \frac{1}{\omega^2 C^2}} = (1+\epsilon) \cdot \frac{1}{\omega C}$$

This equation may be rewritten as follows:

$$1+\epsilon = \sqrt{\omega^2 C^2 R^2 + 1} \qquad (1)$$

Equivalents for some of the parameters of the foregoing equation designated (1) are as follows:

$$R = \rho \cdot \frac{S_1}{A} \text{ and } C = \frac{K \cdot A}{4K \cdot S_2 \cdot 9 \cdot 10^{11}}$$

where:

$\rho$ = resistivity for the poor insulating material,
$S_1$ = thickness of layer of poor insulating material,
$S_2$ = thickness of layer comprising electroluminescent phosphor,
$K$ = dielectric constant of layer comprising phosphor,
$A$ = surface area of light-emitting face of cell.

Substituting the foregoing equivalents into the equation designated (1), the following equation is readily derived:

$$1+\epsilon = \sqrt{\left(\frac{f \cdot S_1 \cdot K \cdot \rho}{S_2 \cdot 18 \cdot 10^{11}}\right)^2 + 1} \qquad (2)$$

Further, the percentage of voltage drop which will occur across the layer 16 comprising the electroluminescent phosphor during operation of the cell may be represented by the equation:

$$\frac{1}{1+\epsilon} = \frac{1}{\sqrt{\left(\frac{f \cdot S_1 \cdot K \cdot \rho}{S_2 \cdot 18 \cdot 10^{11}}\right)^2 + 1}} \qquad (3)$$

Normally both sides of Equation 3 will approach unity inasmuch as the parameter $\epsilon$ is very small. Accordingly, the following expression will be very small as compared to unity:

$$f \cdot \frac{S_1}{S_2} \cdot \frac{K \cdot \rho}{18 \cdot 10^{11}} \qquad (4)$$

In the event any incipient breakdown tends to occur across the layer comprising the phosphor, the cross-sectional area of such breakdown will be extremely small, at least in its formative or incipient stages. The conductivity of such breakdown area, however, will be quite large as compared to the conductivity of the layer 18 of poor insulating material. At the interface of the layers 16 and 18 in the vicinity of the incipient electrical breakdown, a point of high-contact resistivity occurs, the resistance of which is expressible by the following usual formula for such phenomenon:

$$R = \frac{\rho}{4a} \qquad (5)$$

where "$a$" is the radius of the incipient spark during the moment of breakdown.

In order to prevent any extension of the breakdown through the layer 18 of poor insulating material, it is desirable to maintain the current through the incipient spark as small as possible. Thus it is desirable to maintain $\rho$ at as high a value as possible to minimize the current. Referring to the expression designated (4), however, in order to maintain this expression as small as possible, it is desirable to maintain the resistivity $\rho$ as small as possible. In addition, the relation $S_1/S_2$ in Expression 4 should be as small as possible to maintain its value as low as possible, but conversely, the ratio of $S_1/S_2$ should be fairly great in order to form a point of high-contact resistivity at the interface of the layers 16 and 18 during the formation of any incipient breakdown. As a matter of compromise the value of $S_1/S_2$ should be at least 2 and preferably is about 10.

Referring to the equation designated (2), for a small value of epsilon, the equation may be simplified as follows:

$$\rho = 1.8 \cdot 10^{10} \cdot \frac{S_2 \sqrt{2\epsilon}}{f \cdot K \cdot S_1} \quad (6)$$

Accordingly the value of $\rho$ will be determined by a plurality of parameters. To illustrate specific examples, the following arbitrary values can be established for the foregoing parameters contained in Equation 6, in order to observe the variation in the desired values for $\rho$:

$S_1 = 50$ microns (this is a good representative value as may be encountered in practice).

$S_2 = 500$ microns (this is in accordance with the preferred ratio of $S_1/S_2 = 10$).

$\epsilon = 10^{-2}$, which is preferred for best performance.

$K = 20$, which is a representative of the dielectric constant for the layer comprising the field-responsive phosphor.

Following is a table designated I, tabulating frequencies at which the foregoing arbitrary cell may be operated versus the desired values of resistivity for the layer 18 of poor insulating material for the specific electroluminescent cell as given hereinbefore. The values as given in this table are obtained from substitution into the formula designated (6):

Table I

| $f$ (frequency) c.p.s. | $\rho$ (resistivity) ohm-cm. |
|---|---|
| 20 | $6.3 \cdot 10^7$ |
| 60 | $2.1 \cdot 10^7$ |
| 100 | $1.3 \cdot 10^7$ |
| 200 | $6.3 \cdot 10^6$ |
| 500 | $2.5 \cdot 10^6$ |
| 1,000 | $1.3 \cdot 10^6$ |
| 2,000 | $6.3 \cdot 10^5$ |
| 5,000 | $2.5 \cdot 10^5$ |
| 10,000 | $1.3 \cdot 10^5$ |
| 20,000 | $6.3 \cdot 10^4$ |

As will be observed from the foregoing Table I, for lower frequencies a higher resistivity is desired and vice versa, for higher operating frequencies a lower resistivity is desired. Also, as will be apparent from the foregoing equation designated (6), for each individual cell construction, a different design will be required for the layer of poor-insulating material. Such required dimensions and electrical characteristics may be readily calculated from the foregoing formula designated (6) and an almost infinite number of variations are possible.

Figure 1:
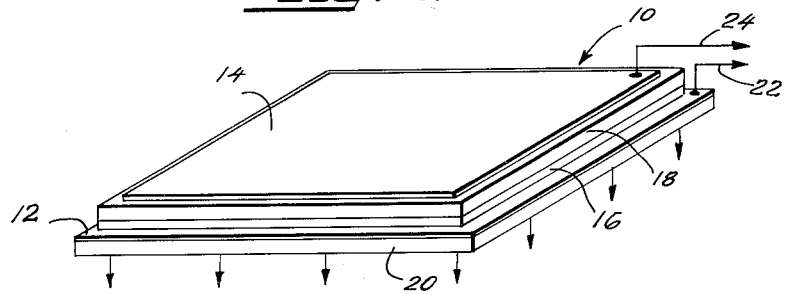
FIG. 1 is a perspective view of an electroluminescent cell incorporating the additional layer of poor insulating material between the electrodes.

In the embodiment described in FIGS. 1 and 2, the layer 18 of poor-insulating material has been placed adjacent the normally-opaque second electrode layer 14 and when operating the cell, light will be emitted from the phosphor and through the transparent, conducting electrode layer 12. In such a case, the poor-insulator layer 18 may be fabricated either of the Transite or the varnish containing the acetylene black, as hereinbefore specified, which materials are normally opaque. With such a construction, it may be desirable to include a thin layer of finely-divided light-reflecting material, such as a 15 micron-thick layer of magnesia, between the layers 16 and 18.

In some cases it may be desirable to place the layer of poor insulating material adjacent the electrode 12 which is light-transmitting in nature and such an embodiment is illustrated in FIG. 3. In this case, it is necessary to fabricate the poor-insulating-material layer 18a of either the light-transmitting zinc oxide or titanium dioxide, for example, in order that the light generated by the layer 16a comprising the phosphor may be transmitted through the transparent conducting electrode layer 12. In such an embodiment both electrode layers could be made light transmitting, if desired.

For some applications it may be desirable to dispense with the dielectric material which is admixed with the phosphor and the embodiments shown in FIGS. 2 or 3 may readily be altered in this respect. Desirably, however, a dielectric material is admixed with the phosphor in order to obtain the best possible output.

In the foregoing embodiments, the electroluminescent phosphor materials have been in a finely-divided form with an average particle size of about 20 microns, for example. It is also possible to apply the instant construction to thin continuous films 16b of electroluminescent materials, as shown in FIG. 4. Such thin-film phosphors are described in Feldman and O'Hara article titled "Formation of Luminescent Screens by Evaporation," Journal of the Optical Society of America, pages 300–305, volume 47, Number 4, April 1957. As a specific example, the zinc sulphide-copper activated phosphors may be deposited by the technique disclosed by Feldman and O'Hara to a thickness of about one micron, for example, and the poor-insulating-material layer 18b may have a thickness of about fifteen microns, for example, and be fabricated of materials as given in the foregoing embodiments.

It is also possible to separate the layer comprising the electroluminescent phosphor into two individual layers 26 and 28 placed on either side of a poor-insulating-material layer 18c and such an embodiment is disclosed in FIG. 5. In calculating the specific dimensions and electrical characteristics for the layer 18c of poor-insulating material for such an embodiment, the two individual layers 26 and 28 comprising the electroluminescent phosphor should be considered as one layer with respect to their total thickness.

In actual tests conducted on electroluminescent cells utilizing the additional layer of poor-insulating material as described herein, it has been possible to increase the normal maximum voltage applied across any given layer comprising electroluminescent phosphor by a factor of five without encountering any electrical breakdown. Such an increase in potential will correspondingly increase the field intensity applied across the layer comprising the electroluminescent phosphor. To achieve such increased field intensity, the potential applied to the cell electrodes may be increased or the layer comprising the electroluminescent phosphor may be made correspondingly thinner. In either case, any tendency for an electrical breakdown across the layer comprising the electroluminescent phosphor is inhibited by the additional layer comprising the poor insulating material. From a theoretical standpoint, a five-fold increase in field intensity will result in increasing the brightness of the cell by a factor of twenty. While this twenty-fold brightness increase is limited in some cases by the tendency of some phosphors to saturate under extremely high fields, a considerable brightness increase will normally be obtained. Another advantage obtained from the instant cell is that the brightness is more uniform. In explanation, with the electroluminescent cells of the prior art, slight variations in spacing between the electrodes will result in non-uniform fields, resulting in a non-uniform brightness. With the additional layer comprising the poor insulating material, slight variations in electrode spacing have less effect, resulting in a more uniform brightness for the cell.

It will be recognized that the objects of the invention have been achieved by providing an electroluminescent cell which is protected against electrical breakdown between the cell electrodes, which cell can be operated with an increased brightness and which brightness is quite uniform. In addition, there have been provided alternative embodiments for an electrical-breakdown-protected electroluminescent cell.

While one best-known embodiment of the invention has been illustrated and described in detail, it is to be particularly understood that the invention is not limited thereto or thereby.

We claim:

1. An electrical-breakdown-protected electroluminescent cell adapted to be energized to light emission by an alternating electric potential and comprising, a first electrode layer, a second electrode layer spaced slightly apart from said first electrode layer, said electrode layers adapted to have an alternating potential applied thereto, at least one layer comprising electroluminescent phosphor included between said electrode layers, and an additional layer comprising poor insulating material also included between said electrode layers, at least one of said electrode layers being light transmitting and in the case said layer of poor insulating material is opaque, the electrode layer positioned adjacent said layer comprising electroluminescent phosphor being light transmitting, the respective properties of said poor-insulating material layer and said layer comprising electroluminescent phosphor being selected according to the following formula:

$$\rho = 1.8 \cdot 10^{10} \cdot \frac{S_2 \sqrt{2\epsilon}}{f \cdot K \cdot S_1}$$

where:

$\rho$ = resistivity in ohm-cm. of said poor-insulating-material layer,
$S_1$ = thickness in cm. of said poor-insulating-material layer, where $S_1$ is at least twice $S_2$,
$S_2$ = total thickness in cm. of said layer comprising electroluminescent phosphor,
$K$ = dielectric constant of said layer comprising electroluminescent phosphor,
$f$ = frequency in c.p.s. of alternating potential adapted to be applied to said electrode layers,
$\epsilon$ = from about 0.001 to about 0.1.

2. An electrical-breakdown-protected electroluminescent cell adapted to be energized to light emission by an alternating electric potential and comprising, a first electrode layer, a second electrode layer spaced slightly apart from said first electrode layer, said electrode layers adapted to have an alternating potential applied thereto, a layer comprising electroluminescent phosphor included between said electrode layers, and an additional layer comprising poor insulating material also included between said electrode layers, at least one of said electrode layers being light transmitting and in the case said layer of poor insulating material is opaque, the electrode layer positioned adjacent said layer comprising electroluminescent phosphor being light transmitting, the respective properties of said poor-insulating-material layer and said layer comprising electroluminescent phosphor being selected according to the following formula:

$$\rho = 1.8 \cdot 10^{10} \cdot \frac{S_2 \cdot \sqrt{2\epsilon}}{f \cdot K \cdot S_1}$$

where:

$\rho$ = resistivity in ohm-cm. of said poor-insulating-material layer,
$S_1$ = thickness in cm. of said poor-insulating-material layer, where $S_1$ is at least twice $S_2$,
$S_2$ = total thickness in cm. of said layer comprising electroluminescent phosphor,
$K$ = dielectric constant of said layer comprising electroluminescent phosphor,
$f$ = frequency in c.p.s. of alternating potential adapted to be applied to said electrode layers,
$\epsilon$ = from about 0.001 to about 0.1.

3. An electrical-breakdown-protected electroluminescent cell adapted to be energized to light emission by an alternating electric potential and comprising, a first electrode layer, a second electrode layer spaced slightly apart from said first electrode layer, said electrode layers adapted to have an alternating potential applied thereto, a thin continuous film layer of electroluminescent phosphor included between said electrode layers, and an additional layer comprising poor insulating material also included between said electrode layers, at least one of said electrode layers being light transmitting and in the case said layer of poor insulating material is opaque, the electrode layer positioned adjacent said thin-film layer of electroluminescent phosphor being light transmitting, the respective properties of said poor-insulating-material layer and said thin-film layer of electroluminescent phosphor being selected according to the following formula:

$$\rho = 1.8 \cdot 10^{10} \cdot \frac{S_2 \cdot \sqrt{2\epsilon}}{f \cdot K \cdot S_1}$$

where:

$\rho$ = resistivity in ohm-cm. of said poor-insulating-material layer,
$S_1$ = thickness in cm. of said poor-insulating-material layer, where $S_1$ is at least twice $S_2$,
$S_2$ = total thickness in cm. of said thin-film layer of electroluminescent phosphor,
$K$ = dielectric constant of said thin-film layer of electroluminescent phosphor,
$f$ = frequency in c.p.s. of alternating potential adapted to be applied to said electrode layers,
$\epsilon$ = from about 0.001 to about 0.1.

4. An electrical-breakdown-protected electroluminescent cell adapted to be energized to light emission by an alternating electric potential and comprising, a first electrode layer, a second electrode layer spaced substantially parallel to and slightly apart from said first electrode layer, said electrode layers adapted to have an alternating potential applied thereto, a layer comprising electroluminescent phosphor included between said electrode layers, and an additional layer comprising poor insulating material also included between said electrode layers, at least one of said electrode layers being light transmitting and in the case said layer of poor insulating material is opaque, the electrode layer positioned adjacent said layer comprising electroluminescent phosphor being light transmitting, the respective properties of said poor-insulating-material layer and said layer comprising electroluminescent phosphor being selected according to the following formula:

$$\rho = 1.8 \cdot 10^{10} \cdot \frac{S_2 \sqrt{2\epsilon}}{f \cdot K \cdot S_1}$$

where:

$\rho$ = resistivity in ohm-cm. of said poor-insulating-material layer,
$S_1$ = thickness in cm. of said poor-insulating-material layer, where $S_1$ is about ten times $S_2$,
$S_2$ = total thickness in cm. of said layer comprising electroluminescent phosphor,
$K$ = dielectric constant of said layer comprising electroluminescent phosphor,
$f$ = frequency in c.p.s. of alternating potential adapted to be applied to said electrode layers,
$\epsilon$ = about 0.01.

References Cited in the file of this patent

UNITED STATES PATENTS

| | | |
|---|---|---|
| 2,709,765 | Koller | May 31, 1955 |
| 2,714,683 | Jenkins | Aug. 2, 1955 |
| 2,780,731 | Miller | Feb. 5, 1957 |
| 2,780,746 | Arnott | Feb. 5, 1957 |